Figure 1:
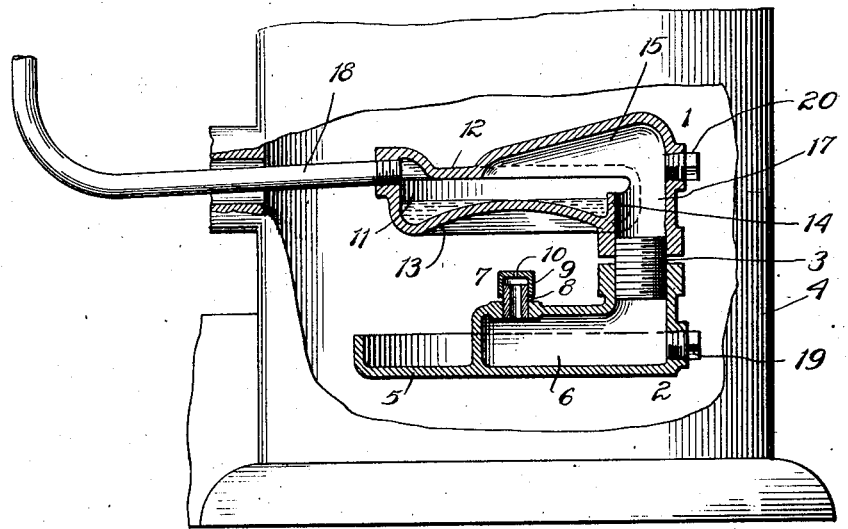

Aug. 17, 1926.

G. D. SUNDSTRAND 1,596,256

BURNER

Original Filed April 5, 1920

Inventor
Gustaf D. Sundstrand
By Churchill Parker & Carlson
Attys

Patented Aug. 17, 1926.

1,596,256

UNITED STATES PATENT OFFICE.

GUSTAF DAVID SUNDSTRAND, OF ROCKFORD, ILLINOIS, ASSIGNOR, BY MESNE ASSIGNMENTS, TO ROCKFORD TOOL COMPANY, OF ROCKFORD, ILLINOIS, A CORPORATION OF ILLINOIS.

BURNER.

Original application filed April 5, 1920, Serial No. 371,433. Divided and this application filed February 8, 1923. Serial No. 617,857.

My invention relates to liquid fuel burners and more particularly to an improved burner especially adapted for use with heaters or stoves of the general type shown in my copending application, Serial No. 371,433, filed April 5th, 1920, which has matured into a Patent Number 1,451,126, patented April 10, 1923, of which this application is a division.

One of the objects of my invention is to provide an improved burner for the use of liquid fuel such as kerosene or the like. In heaters of the general type shown in the above mentioned application, and fragmentarily shown in the drawing forming part of this application, it is highly desirable that the radiating surface be uniformly heated. Burners as heretofore constructed have failed to satisfactorily heat the entire radiating surface of the heaters or stoves uniformly, and another object of the invention is to provide a liquid fuel burner which may if desired be made to produce a flame substantially covering the inner surface of the heater.

A further object is to provide a liquid fuel burner which has an initial concentrated flame impinging on the vessel containing the liquid fuel so that the fuel is volatilized before combustion occurs, and having the wall of the containing vessel shaped so that the impinging flame is deflected laterally for uniform distribution over the radiating surface of the heater in which the burner is mounted.

Further objects and advantages of my invention will become apparent as the description proceeds.

Figure 2:
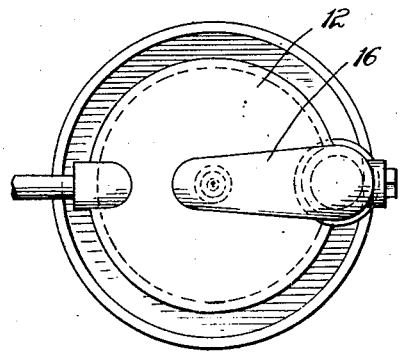
Figure 3:
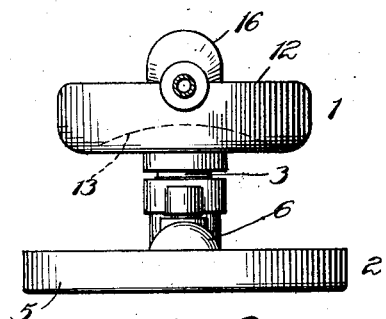

In the accompanying drawing, Figure 1 is a vertical sectional view of a burner embodying the principles of my invention, the burner being shown mounted in a heater whose walls are partially broken away so as to more clearly disclose the heater. Fig. 2 is a plan view of the burner, and Fig. 3 is an elevation as viewed from the fuel inlet side.

In the embodiment of my invention selected for illustration, the burner comprises an upper portion 1 and a lower portion 2, each preferably formed of cast metal and connected by a threaded tubular member 3. In Fig. 1 the burner is shown positioned near the bottom of a circular stove 4, only a fragmentary portion of the stove being shown.

The lower portion 2 comprises a drip pan 5 and a duct 6 which terminates in an upwardly extending nozzle or orifice 7. The upper and lower portions of the burner are in substantially vertical alinement with the orifice 7 positioned approximately beneath the center of the upper portion. The orifice 7 is illustrated as comprising an upwardly directed tube 8 and a nipple 9 having an aperture 10 formed therein to provide an outlet for the liquid and gaseous fuel coming from the upper portion through the tubular member 3.

The upper portion 1 comprises a closed evaporating pan 11 having an upper wall 12 and an inwardly concaved bottom 13 of approximately spherical shape. The concaved bottom portion 13 is provided with a rim or retaining wall 14 which extends to a level slightly higher than the highest portion of the bottom. A duct 15 is formed by providing an upwardly projecting rib 16 in the upper wall 12. The outer end of the duct 15 emerges into a downwardly directed tubular member 17 which serves as an outlet for liquid fuel overflowing the wall 14 as well as an outlet for the gas which is generated by evaporation of the liquid fuel contained in the pan 11. The gas and overflow fuel reach the duct 6 and orifice 7 through the tubular member 3.

A supply tube 18 is adapted to support the burner in the stove 4 and to deliver liquid fuel to the pan 11 from a supply (not shown). The tube 18 is preferably slightly inclined upwardly toward the pan 11 to prevent escape of the volatilized fuel in the form of bubbles through the tube 18. The flow of liquid fuel through the tube 18 may be regulated by providing valves (not shown) in the tube 18.

Apertures in the outer ends of ducts 6 and 15 are normally closed by plugs 19 and 20, respectively, which may be removed if desired to clean the ducts.

The operation of my device is as follows:—With the burner mounted on the supply tube 18, as shown, liquid fuel is permitted to flow into and overflow the evaporating pan 11 until tube 6 is filled and discharges through the aperture 10 into the drip pan 5. The overflowing liquid is then lighted and the heat therefrom starts volatilization of the fluid contained in the evaporating pan 11. The gas so generated escapes through the orifice 7 by way of the duct 15, the tubular member 3 and the duct 6. The flow of liquid fuel into the evaporating pan is adjusted so that the liquid is all volatilized by the flame and overflow from the evaporating pan ceases and yet is supplied rapidly enough to keep the bottom of the pan covered. The flame which is concentrated on the bottom of the pan is of sufficient intensity to melt the bottom of the pan in a short time unless covered by the liquid. The operation is terminated by merely shutting off the oil supply. The liquid remaining in the shallow pan is all volatilized and the resulting gas consumed before the pan is sufficiently heated to cause it to melt or be otherwise damaged. The high intensity of the concentrated flame causes it to spread out laterally and rise in a cylinder like form adjacent to the inner surface of the stove thereby heating the radiating surface of the stove substantially uniformly. The spherical shape of the bottom of the evaporating pan causes the flame to leave the pan in a slightly downward direction thereby causing the flame to spread laterally more than if it left the pan in a horizontal or an upwardly inclined direction.

While I have illustrated and described in detail the preferred embodiment of my invention, it should be clearly understood that this disclosure is merely for purposes of illustration and that many modifications and variations will naturally occur to those skilled in the art. I aim in the subjoined claim to cover all such legitimate variations and modifications.

I claim as my invention:

A fuel oil burner of the class described having, in combination, a fuel discharge orifice opening upwardly, a drip pan surrounding said orifice, a closed evaporating pan having an upwardly convex bottom positioned directly above said orifice, an oil supply tube connected to the upper portion of said evaporating pan, a gas and liquid fuel conveying duct joining said orifice and said evaporating pan, said evaporating pan having an internal upstanding retaining wall over which liquid and gas must pass to reach said conveying duct, the highest level of said retaining wall lying in a horizontal plane intermediate said supply tube and the highest point of said upwardly convex bottom.

In testimony whereof, I have hereunto affixed my signature.

GUSTAF DAVID SUNDSTRAND.